United States Patent
James et al.

(10) Patent No.: US 6,661,949 B1
(45) Date of Patent: Dec. 9, 2003

(54) TOTALLY PHOTONIC EVANESCENT SWITCH FOR OPTICAL FIBERS

(76) Inventors: Kenneth A. James, P.O. Box 1184, Pauma Valley, CA (US) 92061; Jonathan W. Yee, 4312 Livermore Pl., Cypress, CA (US) 90630

( * ) Notice: Subject to any disclaimer, the term of this patent is extended or adjusted under 35 U.S.C. 154(b) by 358 days.

(21) Appl. No.: 09/795,781

(22) Filed: Mar. 1, 2001

(51) Int. Cl.[7] .............................. G02B 6/35; G02B 6/24
(52) U.S. Cl. ............................. 385/30; 385/40; 385/41
(58) Field of Search ........................... 385/30, 12, 13, 385/40, 41

(56) References Cited

U.S. PATENT DOCUMENTS

| | | | |
|---|---|---|---|
| 5,253,094 A | | 10/1993 | Smith et al. |
| 5,367,584 A | * | 11/1994 | Ghezzo et al. ................ 385/17 |
| 5,504,607 A | | 4/1996 | Smith et al. |
| 5,729,641 A | | 3/1998 | Chandonnet et al. |
| 5,768,462 A | | 6/1998 | Monte et al. |
| 5,854,864 A | | 12/1998 | Knoesen et al. |
| 5,862,276 A | * | 1/1999 | Karras ........................... 385/30 |
| 6,047,095 A | | 4/2000 | Knoesen et al. |
| 2001/0055443 A1 | * | 12/2001 | Zhao et al. .................... 385/30 |

OTHER PUBLICATIONS

Kim et al "Measurement of Behaviors of Optical Filter using Evanescent Field Coupling between Single Mode Fiber and Multimode Planar Waveguide" Journal of IEEE of Korea, vol. 36, no 7 p42–49. Jul. 1999.*

Nasr et al "Analysis of optical switches" SPIE Conference on Coposite Materilas and Applications, vol. 3786, Jul. 1999, p. 191–199.*

Ura et al. "An integrated–optic device using electrooptic polymer waveguide on Si substrate for modulating focus spot intensity distribution" IEEE Photonics Technology Letters, vol 5, no 11, Nov. 1993.*

Booth, Bruce "Polymers for integrated waveguides" Polymers for Electronic and Photonic Applications, AT&T Bell Laboratories, 1993, ISBN 0–12–762540–2.*

Tumolillo et al "A novel pulse–poling technique for EO polymer waveguide devices using device electrode poling" IEEE Photonics Technology Letters, vol. 4, no 2, Feb. 1992, pp 142–145.*

McCallion et al "An optical fibre switch using electro–optic waveguide interlays" SPIE vol 1580 Fiber Optic Components and Reliability (1991).*

* cited by examiner

Primary Examiner—Edward J. Glick
Assistant Examiner—Krystyna Suchecki
(74) Attorney, Agent, or Firm—Morland C. Fischer

(57) ABSTRACT

A totally photonic switch having a pair of D-optical fibers by which optical energy can be efficiently coupled at high speed from one D-fiber to the other. The cores of the D-fibers are held in close proximity to one another at opposite sides of a thin (e.g., film) evanescent coupling region that is fabricated from a doped semiconductor based material (e.g., silicon dioxide). A pair of thin metal electrodes are located between the pair of D-fibers and the opposite sides of the evanescent coupling region by which to cause the coupling region to become electrooptic, to bond the fibers to the coupling region, and to receive a controlled voltage from a DC voltage source. Optical energy is coupled (i.e., switched) between the D-fibers depending upon the magnitude of the voltage applied to the electrodes. A plurality of such totally photonic switches can be arranged to form a coupler network on a semiconductor wafer so as to route optical signals over a selected switch path between input and output sides of the network.

20 Claims, 2 Drawing Sheets

TOTALLY PHOTONIC EVANESCENT SWITCH FOR OPTICAL FIBERS

BACKGROUND OF THE INVENTION

1. Field of the Invention

This invention relates to a totally photonic switch having a pair of D-optical fibers separated by an evanescent coupling region and a pair of thin metal electrodes to which a voltage is applied for causing optical signals to be transferred between the pair of optical fibers in a predictable and controllable manner.

2. Background Art

The totally photonic switch which forms the present invention uses principles that are characteristic of a conventional passive 3 db fiber coupler. Such a conventional fiber coupler is typically fabricated by twisting two identical fibers together under high heat and tension. The tension under heat deforms the fibers to reduce the thickness of their claddings whereby an optical signal is evanescently coupled from one fiber to the other. This twisting of the fibers effectively compresses the length of the coupling or interactive region therebetween so that the coupler can be accommodated according to known packaging techniques, especially in situations where half the optical energy is to be coupled between the fibers.

Doubling the half energy coupling length will permit all of the optical signal to be evanescently coupled, while quadrupling the half energy coupling length will cause the signal to couple completely from one fiber to the other and then completely back to the original fiber. If the evanescent coupling could be controlled (i.e., varied by a factor of 2) over a fixed coupling length, an input optical signal could be switched between two optically coupled fibers.

However, it is difficult to achieve optimal and predictable evanescent coupling in an optical switch by using the conventional technique of twisting together a pair of optical fibers. Firstly, the twisted fibers are bulky and would consume a large area, particularly if a switch network were contemplated using conventional planar semiconductor processing techniques. Moreover, it would be unlikely that the fibers from different couplers could be identically twisted, such that some of the optical switches would have different physical characteristics that vary slightly from one to the other and, consequently, mismatched optical characteristics. What is more, a twisted fiber switch is not electrically controllable, whereby the maximum switching (i.e., coupling) speed would be undesirably limited. In addition, the twisted fiber construction is not compatible with modern photolithographic and microelectronic fabrication processes.

Fiber coupling structures are known in which direct fiber-to-fiber coupling is not possible. Some fiber coupling structures interrupt the fiber path and use a wave guide which correspondingly results in a space consuming fiber-to-wave guide-to-fiber optical path. Other fiber coupling structures require the inefficient use of liquids, mirrors and similar mechanical reflective devices (e.g., including baffles, flexures and the like) which slows the speed in which optical energy can be coupled from one transmission path to another and makes the optical coupling difficult to control. Examples of known optical couplers like those described above are available by referring to one or more of the following Untied States patents:

| | |
|---|---|
| 5,253,094 | 12 Oct. 1993 |
| 5,504,607 | 2 Apr. 1996 |
| 5,729,641 | 17 Mar. 1998 |
| 5,768,462 | 16 June 1998 |
| 5,854,864 | 29 Dec. 1998 |
| 6,047,095 | 4 Apr. 2000 |

SUMMARY OF THE INVENTION

A totally photonic switch is disclosed for the high speed, efficient fiber-to-fiber coupling of optical signals between a pair of D-shaped optical fibers. A pair of axially aligned troughs are formed in the top and bottom of a semiconductor (e.g., silicon) substrate. The axially aligned troughs are preferably etched in the substrate so as to have a trapezoidal shape and a thin silicon coupling region that is shared by the troughs as a common bottom. The D-fibers are received within respective troughs and laid face-to-face one another against opposite sides of the coupling region so that the cores of the fibers are arranged in close proximity.

The silicon coupling region that is shared by the bottoms of the troughs is completely oxidized to form a thin film silicon dioxide evanescent coupling region extending between the fiber cores. Prior to oxidizing, the silicon coupling region may be doped to an index of refraction that is similar to the cores of the D-fibers. An ultra thin metal film is applied along the top and bottom of the silicon dioxide evanescent coupling region to create a pair of electrodes. By poling the electrodes during fabrication of the switch (i.e., applying a DC voltage to the electrodes at the same time that the semiconductor substrate is heated), the silicon dioxide evanescent coupling region will be polarized so as to become electrooptic. Following fabrication, another DC voltage is applied to the electrodes to selectively control the switch and the coupling of optical energy between the cores of the D-fibers. By applying localized heat, the thin metal film electrodes can also be used to bond the opposing flat faces of the D-fibers to the top and bottom of the silicon dioxide evanescent coupling region. Ultra thin metal films and the aforementioned localized heating can also be employed to bond the D-fibers to the relatively thick silicon dioxide passivation region. As in the case of the thin film silicon evanescent coupling region, the index of refraction of the relatively thick passivation region can be chosen to match that of the cladding of the D-fibers. Accordingly, the cores of the D-fibers received within the axially aligned troughs are separated only by the required cladding thickness along the flat faces thereof, the thin silicon dioxide electrooptic evanescent coupling region running between the flat faces, and the ultra-thin metal electrodes bonded to the top and bottom of the coupling region.

Optical signals are switched between the cores of a pair of the D-shaped optical fibers of a single photonic switch or a plurality of photonic switches arranged on a semiconductor wafer to form a fiber coupler network. That is, by driving the electrodes which extend along the top and bottom of the evanescent coupling region of the photonic switch to a first DC voltage (e.g., ground), an optical signal is transferred from one of the pair of optical fibers to the other. However, by driving the electrodes of the photonic switch to a second DC voltage (e.g., 3.0 volts), an optical signal is transferred from one of the pair of optical fibers to the other and then back to the first fiber so that the optical signal carried on the first fiber is preserved.

DETAILED DESCRIPTION

Figure 1:
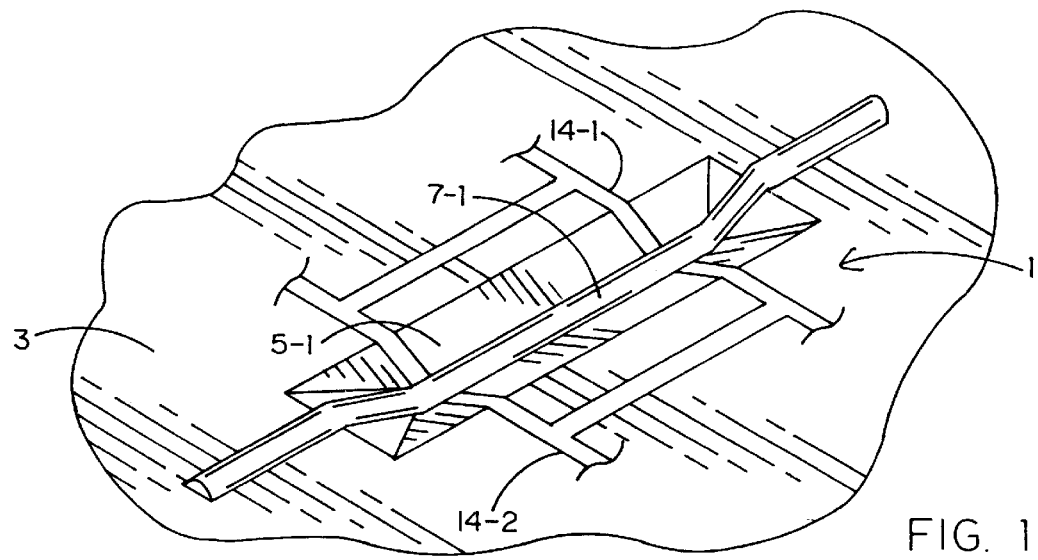
FIG. 1 illustrates the top of a semiconductor substrate within which the totally photonic switch which forms the present invention is fabricated.

The totally photonic switch which forms the present invention is initially described while referring to FIG. 1 of the drawings, where there is shown an optical fiber coupler 1. Fiber coupler 1 is formed on a semiconductor (e.g., silicon, or the like) substrate 3. A pair of long and narrow, preferably trapezoidal, troughs (designated 5-1 and 5-2 and best shown in FIG. 3) are formed in the opposite sides of the substrate 3. Each trough (e.g., 5-1) is formed by a conventional technique such as, but not limited to, chemical (KOH) or ion mill etching methods. As is best shown in FIG. 3, the pair of trapezoidal troughs 5-1 and 5-2 are axially aligned bottom-to-bottom one another by means of a standard semiconductor photolithographic process. The bottoms of the oppositely aligned troughs 5-1 and 5-2 are sized to match the diameters of a pair of optical D-fibers (designated 7-1 and 7-2 and best shown in FIGS. 2 and 3) that are to be received therein and aligned face-to-face one another.

As will be known to those skilled in the art, each D-fiber 7-1 and 7-2 is produced by extruding or otherwise machining away a portion of the outer cladding of the fiber to about a micron of the core, thereby forming a flat polished face on one side thereof. This process creates a fiber,having a D-shaped cross section. Such a D-fiber 7-1 and 7-2 can be manufactured in either multimode or single mode form and adapted to be polarization maintaining, if required.

As is best shown in FIG. 3 of the drawings, the pair of D-fibers 7-1 and 7-2 are received within the trapezoidal troughs 5-1 and 5-2 formed in the semiconductor substrate 3, such that the flat faces of the fibers are disposed one above the other with the fiber cores held in close proximity. By virtue of an accurate sizing and alignment of the opposing toughs 5-1 and 5-2, the cores of D-fibers 7-1 and 7-2 will be automatically and correspondingly aligned with one another to enable efficient evanescent coupling therebetween, as well as the ability to electrically alter the coupling so as to create the photonic switch/coupler 1 of this invention. As will soon be explained, the photonic switch herein disclosed allows more reliable optical coupling and switching and much faster switch speeds than would otherwise be available by using conventional coupling and switching techniques, such as where a pair of optical fibers are twisted and deformed to bring their cores into close proximity, and other conventional optical switching devices including MEMS, LCD switches, and the like.

Figure 2:
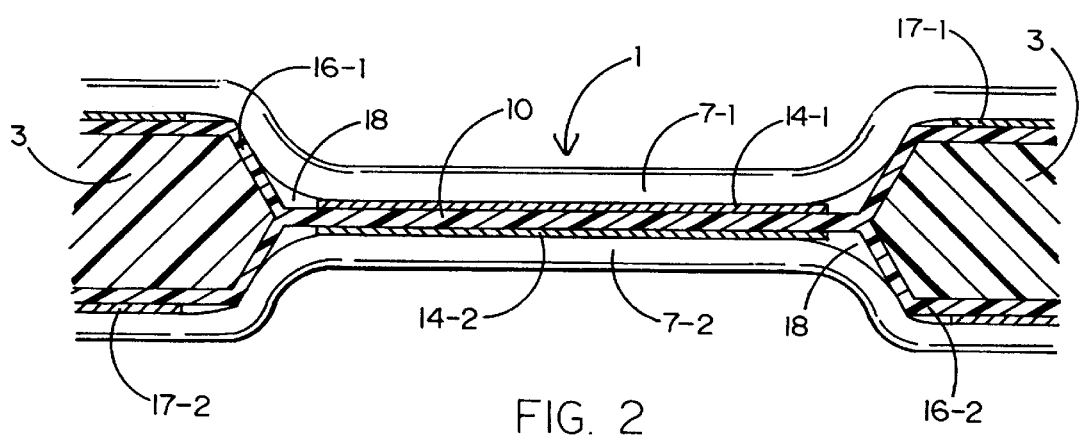
FIG. 2 shows the totally photonic switch of FIG. 1 having a pair of D-fibers aligned one above the other and separated by an evanescent coupling region.
Figure 3:
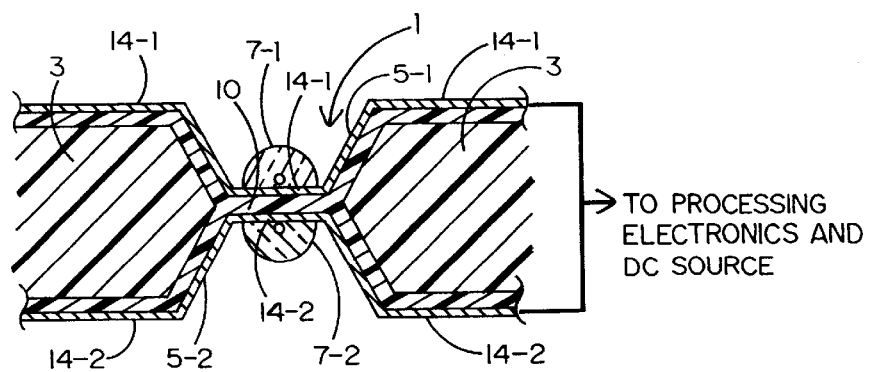
FIG. 3 shows the face-to-face alignment of the D-fibers of FIG. 2 within oppositely and axially aligned trapezoidal shaped troughs formed in the semiconductor substrate.

Turning now to FIG. 2 of the drawings, it will be recognized that the opposing trapezoidal troughs 5-1 and 5-2 formed in the semiconductor substrate 3 effectively share a common bottom which establishes a thin silicon evanescent coupling region 10 between the opposing faces of the D-fibers 7-1 and 7-2. Known semiconductor processing techniques may be employed to assure a uniform evanescent coupling region 10. In addition, an ion implanted etch stop may be placed at the same depth in opposite sides of the silicon substrate 3 by which to define the thickness of coupling region 10 and provide for an accurate bottom-to-bottom alignment of the troughs 5-1 and 5-2.

The silicon coupling region 10 running between fibers 7-1 and 7-2 is then completely oxidized to form a thin silicon dioxide film which functions as the shared bottom of troughs 5-1 and 5-2. Doping the silicon coupling region 10 prior to oxidizing to an index of refraction that is similar to that of the cores of the D-fibers 7-1 and 72 can be used to alter the optical index of refraction of the oxidized coupling region along the shared bottom of troughs 5-1 and 5-2.

An ultra thin metal film is applied by a standard metalization process along the top and bottom of the silicon dioxide evanescent coupling region 10 in order to create a pair of electrodes 14-1 and 14-2. The electrodes 14-1 and 14-2 perform three important functions. First, during fabrication of the coupler 1, the electrodes 14-1 and 14-2 are used as poling electrodes. More particularly, after the metal electrodes 14-1 and 14-2 are applied to the evanescent coupling region 10, the substrate 3 is placed in an oven for approximately one hour and heated to a temperature that lies in a range of temperatures between 300–400 degrees C. At the same time that the substrate is heated, a voltage that lies in a range of voltages between 50–70 volts DC is applied to the electrodes. The fabrication step of poling (i.e., simultaneously applying significant heat while subjecting the evanescent coupling region 10 to an electric field) is believed to cause a permanent electrooptic effect in coupling region 10. Such an electrooptic effect will cause a change in the index of refraction of coupling region 10 in a particular direction in response to an applied voltage. Accordingly, by using electrodes 14-1 and 14-2 as poling electrodes, the normally non-electrooptic silicon dioxide evanescent coupling region 10 can be converted to an electrooptic coupling region which is essential to being able to selectively control the switch 1 and the coupling of optical energy between the D-fibers 7-1 and 7-2.

The thin metal film electrodes 14-1 and 14-2 are also used to bond the opposing flat faces of D-fibers 7-1 and 7-2 to the top and bottom of the silicon dioxide evanescent coupling region 10 by applying localized heating to essentially weld the fibers 7-1 and 7-2 to the shared bottom of the troughs 5-1 and 5-2 in which the fibers are received. Following fabrication, and as will be described when referring to FIG. 4, the electrodes 14-1 and 14-2 are connected to a source of DC voltage by which to control the operation of coupler 1 by causing the aforementioned index of refraction change in the silicon dioxide evanescent coupling region 10 along the common bottom of troughs 5-1 and 5-2. Accordingly, the cores of D-fibers 7-1 and 7-2 of coupler 1 will be held in close proximity, separated only by the remaining cladding along their respective flat faces, the thin eletrooptic silicon dioxide coupling region 10, and the ultra thin metal electrodes 14-1 and 14-2.

The D-fibers 7-1 and 7-2 can be bonded to the relatively thick silicon dioxide passivation layers 16-1 and 16-2 by means of very thin metal films 17-1 and 17-2 and the previously described localized heating/welding step by which the fibers are also bonded to the relatively thin silicon dioxide evanescent coupling region 10. As in the case of the thin coupling region 10, the thick silicon dioxide passivation layers 16-1 and 16-2 can be made to have an index of refraction that is similar to that of the cladding of the D-fibers 7-1 and 7-2. Since the D-fibers 7-1 and 7-2 are not perfectly flexible, some air gaps 18 may occur between the fibers and the passivation layers 16-1 and 16-2. It can be appreciated that the index of refraction of air is considerably lower than that of the core or cladding of the D-fibers 7-1 and 7-2 so that little energy will be lost to air gaps 18.

Figure 4:
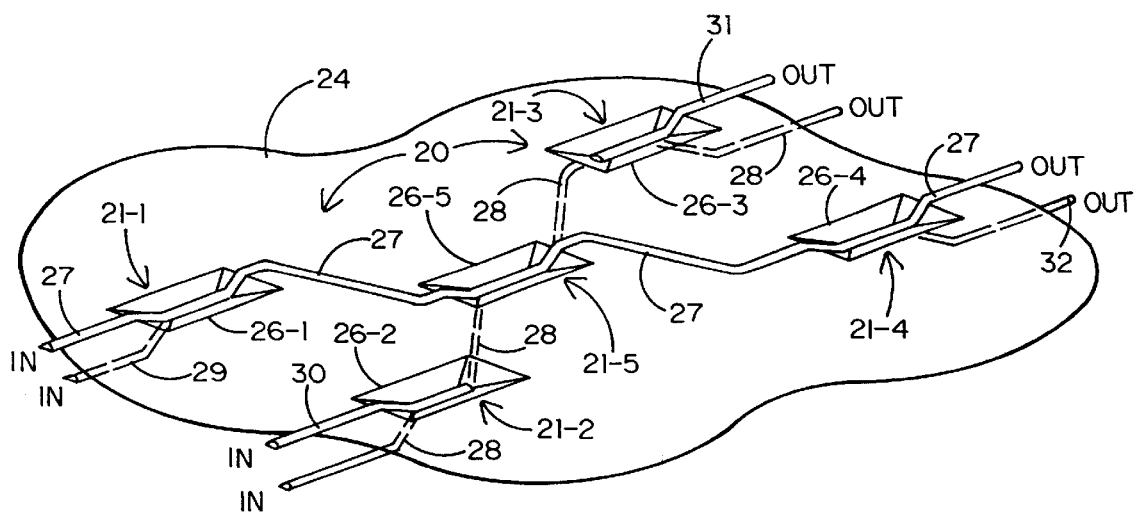
FIG. 4 shows a 4×4 fiber coupler network by which optical signals are coupled between respective pairs of D-fibers from a plurality of the totally photonic switches of this invention.

FIG. 4 of the drawings shows the fiber coupler 1 of FIGS. 1–3 used to form a 4×4 fiber coupler network 20. In this case, fiber coupler network 20 includes an arrangement of five photonic switches 21-1, 21-2, 21-3, 21-4, and 21-5, each of which being identical to the fiber coupler photonic switch 1. Although FIG. 4 illustrates only the top surface of a semiconductor wafer 24 and the first of a pair of actually aligned trapezoidal troughs 26-1, 26-2, 26-3, 26-4, and 26-5 formed therein, it is to be understood that the bottom of wafer 24 having the second of the pair of trapezoidal troughs (not shown) is identical to that shown in FIG. 3, but for the orientation of the optical fiber received therein.

More particularly, a total of six D-optical fibers 27, 28, 29, 30, 31 and 32, are required to implement the 4×4 coupler network 20 of FIG. 4. Photonic switch 26-5 functions as a central routing switch and is located between origination switches 21-1 and 21-2 at the input side of network 20 and terminus switches 21-3 and 21-4 at the output side of network 20. A first optical fiber runs between input and output sides of network 20 through the troughs 26-1, 26-5, and 26-4 of origination switch 21-1, central routing switch 21-5, and terminus switch 21-4 at the top of the semiconductor wafer 24. The second optical fiber 28 runs between the input and output sides of network 20 through the troughs (not shown) that are formed at the bottom of the semiconductor wafer 24 below the troughs 26-2, 26-5 and 26-3 of origination switch 21-2, central routing switch 21-5 and terminus switch 21-3. The third optical fiber 29 runs from the input side of network 20 to and stops at the trough (not shown) that is formed in the bottom of the semiconductor wafer 24 below the trough 26-1 of origination switch 21-1. The fourth optical fiber 30 runs from the input side of network 20 to and stops at the trough 26-2 of origination switch 21-2 that is formed in the top of the semiconductor wafer 24. The fifth optical fiber 31 runs from the trough 36-3 of the terminus switch 21-3 that is formed in the top of the semiconductor wafer 24 to the output side of network 20. Lastly, the sixth optical fiber 32 runs from the trough (not shown) of the terminus switch 21-4 that is formed in the bottom of the semiconductor wafer 24 below the trough 26-2 to the output side of network 20.

Switching (i.e., the optical coupling of energy between the top and bottom D-fibers 7-1 and 7-2) of the switch 1 of FIGS. 1–3 and any of the switches 21-1 . . . 21-5 of the network 20 of FIG. 4 is controlled by applying a low power DC voltage to the thin elecrooptic silicon dioxide evanescent coupling region 10 by way of the electrodes (designated 14-1 and 14-2 of FIGS. 1–3). A suitable DC voltage for controlling the optical coupling between the fibers may be CMOS logic level voltages (e.g., 3.0 volts and ground). Most typically, when an optical switch/coupler is passive and no power is applied to the electrodes 14-1 and 14-2 thereof, optical energy is transmitted from one of the pair of top or bottom fibers 7-1 or 7-2 to the other. When an optical switch/coupler is active such that a voltage is applied across the electrodes, optical energy is transmitted from one of the pair of D-fibers 7-1 or 7-2 to the other and then back to the first fiber so that the optical energy on the first fiber is preserved. That is to say, the poled electrooptic silicon dioxide coupling region 10 causes an optical signal to be coupled back and forth between a pair of D-fibers in a switch/coupler of the network 20 of FIG. 4. Of course, the active and passive states of an optical switch/coupler and the corresponding voltages applied thereto could be reversed if the bias of the electrooptic effect in coupling region 10 were reversed during fabrication of coupler 1.

By way of example, an input optical signal at the input side of the switch network 20 of FIG. 4 is selectively transmitted to the output side over a particular switch path, as follows: The input signal is initially received by the optical fiber 30. By maintaining the origination optical switch 21-2 at a passive switch condition, the optical signal will be transmitted from optical fiber 28 to optical fiber 30. By driving the central routing optical switch 21-5 to an active switch condition, the optical signal is transmitted from optical fiber 28 to optical fiber 27 and then back to optical fiber 28. By driving terminus optical switch 21-3 to a passive switch condition, the optical signal is transmitted from optical fiber 28 to optical fiber 31 where the optical signal is carried to a suitable output terminal (not shown) at the output side of switch network 20.

In this same regard, the electrodes of the same and/or different photonic switches 21-1 21-5 of the 4×4 coupler network 20 (or any other coupler network) can be selectively driven by suitable processing electronics between active and passive switch conditions to rapidly and reliably route a plurality of optical signals between input and output sides of the network without consuming excessive power or space so as to make the network ideally suited for data transmission by employing conventional semiconductor fabricating techniques.

It may now be appreciated by those skilled in the art that the mode structure of the closely spaced fibers is optimized in the switch/coupler herein disclosed which enables both a direct and highly efficient D-fiber-to-D-fiber optical coupling without using a space consuming wave guide structure. What is more, the switch/coupler of this invention can be fabricated entirely according to available photolithographic and microelectronic processes in a completely optical fiber based environment, while avoiding the addition of liquids, mirrors, LCD reflectors, and the like. By virtue of the electrooptic evanescent coupling region, it is possible to actively and selectively control the direction in which optical energy is transferred between a pair of D-fibers in a single switch/coupler as well as a network of switch/couplers.

We claim:

1. An optical switch comprising:

an insulating substrate have top and bottom surfaces and first and second troughs formed in said top and bottom surfaces:

a first optical fiber adapted to carry optical energy located in the first trough formed in the top of said insulating substrate;

a second optical fiber adapted to carry optical energy located in the second trough formed in the bottom of said insulating substrate;

an evanescent coupling region having first and opposite sides and running along the first and second troughs formed in the top and bottom surfaces of said insulating substrate;

a first electrode located between said first optical fiber and the first side of said evanescent coupling region and a second electrode located between said second optical fiber and the opposite side of said evanescent coupling region; and a source of voltage connected to the first and second electrodes at the first and opposite sides of said evanescent coupling region to apply a voltage to said first and second electrodes and thereby control the transfer of optical energy between said first and second optical fibers by way of said evanescent coupling region depending upon the magnitude of said voltage.

2. The optical switch recited in claim 1 wherein each of said first and second optical fibers is a D-shaped fiber.

3. The optical switch recited in claim 2 wherein each of said D-shaped optical fibers has a flat face and a core, said D-shaped optical fibers being arranged face-to-face to one another at the first and opposite sides of said evanescent coupling region so that the respective cores thereof are located in close proximity.

4. The optical switch recited in claim 3, wherein the flat faces of said first and second D-shaped optical fibers are respectively bonded to the first and opposite sides of said evanescent coupling region by way of said first and second electrodes located therebetween.

5. The optical switch recited in claim 2, wherein said first and second troughs are axially aligned so as to share a common bottom, said common bottom running between said first and second D-shaped optical fibers and forming said evanescent coupling region, such that said first and second D-shaped optical fibers are arranged face-to-face to one another across the common bottom of said first and second troughs.

6. The optical switch recited in claim 5, wherein said evanescent coupling region running between said first and second D-shaped optical fibers is formed from a completely oxidized semiconductor material.

7. The optical switch recited in claim 6, wherein said evanescent coupling region is formed from silicon dioxide.

8. The optical switch recited in claim 6, wherein the oxidized semiconductor material of said evanescent coupling region is doped to an index of refraction that matches the index of refraction of the cladding of said first and second D-shaped optical fibers.

9. The optical switch recited in claim 6, further comprising a passivation region communicating with said evanescent coupling region and being formed from the same oxidized semiconductor material from which said evanescent coupling region is formed, and a metal layer by which to bond said passivation region to said first and second D-shaped optical fibers, said passivation region being thicker than said metal layer.

10. The optical switch recited in claim 9, wherein the index of refraction of said relatively thick passivation region matches the index of refraction of the cladding of said first and second D-shaped optical fibers.

11. The optical switch recited in claim 1, further comprising a plurality of said optical switches arranged in a network on said insulating substrate, each of said plurality of optical switches having first and second troughs and first and second D-shaped optical fibers received in said first and second troughs and positioned in face-to-face alignment with one another at first and opposite sides of an evanescent coupling region running therebetween, at least one of said first and second D-shaped optical fibers from at least some of said plurality of optical switches being the same optical fiber.

12. A method for making an optical switch comprising the steps of:
forming a trough in each of the top and bottom of a semiconductor substrate such that said troughs are axially aligned one above the other so as to establish an evanescent coupling region along a shared bottom running between said troughs;
simultaneously applying heat and an electric field to said evanescent coupling region to make said coupling region electrooptic in response to a voltage applied thereto;
positioning an optical fiber in each of said troughs at the top and bottom of said semiconductor substrate so that said optical fibers are separated from one another by said evanescent coupling region;
locating a first electrode between the optical fiber in the trough at the top of said semiconductor substrate and a first side of said evanescent coupling region;
locating a second electrode between the optical fiber in the trough at the bottom of said semiconductor substrate and the opposite side of said evanescent coupling region; and
applying a voltage to said first and second electrodes for controlling the transfer of optical energy between the optical fibers via said evanescent coupling region, said transfer of optical energy depending upon the magnitude of the applied voltage.

13. The method recited in claim 12, including the additional steps of producing each of said optical fibers to have a flat face, and positioning said optical fibers in said axially aligned troughs formed in the top and bottom of said semiconductor substrate such that the flat faces of said optical fibers are positioned against the first and opposite sides of said evanescent coupling region in opposing face-to-face alignment with one another.

14. The method recited in claim 12, including the additional step of oxidizing said evanescent coupling region between said troughs formed in the top and bottom of said semiconductor substrate.

15. The method recited in claim 14, wherein said semiconductor substrate is formed from silicon and said evanescent coupling region consists of silicon dioxide following said oxidizing step.

16. The method recited in claim 14, including the additional step of doping said evanescent coupling region prior to said oxidizing step, such that evanescent coupling region has an index of refraction that matches the index of refraction of the cores of said optical fibers.

17. The method recited in claim 16, including the additional steps of oxidizing said semiconductor substrate to form a passivation region communicating with said evanescent coupling region, and bonding said optical fibers to said passivation region at the top and bottom of said semiconductor substrate.

18. The method recited in claim 17, wherein said passivation region has an index of refraction that matches the index of refraction of the cladding of said optical fibers.

19. A method for making an optical switch comprising the steps of:
locating a first electrode at a first side of an optical coupling region manufactured from a semiconductor material;
locating a second electrode on the opposite side of said optical coupling region;
simultaneously applying heat and an electric field to said optical coupling region for making said coupling region electrooptic in response to a voltage applied thereto;
connecting first and second optical fibers to the first and opposite sides of said optical coupling region by applying heat to said first and second electrodes and thereby bonding said first and second optical fibers to said coupling region by way of said first and second electrodes, such that at least some of said first and second optical fibers are aligned one above the other with said optical coupling region extending therebetween; and
applying a voltage to said first and second electrodes for controlling the transfer of optical energy between said first and second optical fibers via said optical coupling region, said transfer of optical energy depending upon the magnitude of the applied voltage.

20. The method recited in claim 19, including the additional step of applying the electric field to said optical coupling region by means of applying another voltage to said first and second electrodes at the first and opposite sides of said optical coupling region at the same time that said heat is applied for making said coupling region electrooptic.

* * * * *